United States Patent
Drexler et al.

(10) Patent No.: US 12,047,549 B2
(45) Date of Patent: Jul. 23, 2024

(54) MULTI-BAND HOMODYNE ENCODER

(71) Applicant: The United States of America, as represented by the Secretary of the Navy, San Diego, CA (US)

(72) Inventors: Kyle Robert Drexler, San Diego, CA (US); Benjamin Laxton, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 157 days.

(21) Appl. No.: 17/873,010

(22) Filed: Jul. 25, 2022

(65) Prior Publication Data

US 2024/0031546 A1   Jan. 25, 2024

(51) Int. Cl.
   *H04N 13/214*   (2018.01)
(52) U.S. Cl.
   CPC .................. *H04N 13/214* (2018.05)
(58) Field of Classification Search
   CPC ............... H04N 13/214; H04N 23/957; G01B 9/02057; G01B 9/02084; G01B 9/0209
   See application file for complete search history.

(56) References Cited

U.S. PATENT DOCUMENTS

| | | | |
|---|---|---|---|
| 7,768,641 B2 * | 8/2010 | Bearman ............... | G01J 3/0229 356/328 |
| 8,649,008 B2 * | 2/2014 | Kashani ............... | A61B 5/0068 356/322 |
| 2006/0158645 A1 * | 7/2006 | Maier ..................... | G01N 21/65 356/301 |
| 2006/0274308 A1 * | 12/2006 | Brady ....................... | G01J 3/36 356/326 |
| 2010/0309467 A1 * | 12/2010 | Fox ........................ | G01J 3/0294 356/326 |
| 2018/0249100 A1 | 8/2018 | Watson | |

OTHER PUBLICATIONS

K. Drexler and K. Watson, "Digital Adaptive Optics," in Imaging and Applied Optics 2017, OSA Technical Digest, paper CM2B.4 2017.
U.S. Appl. No. 17/679,423, Homodyne Encoder System with Adaptive Path Length Matching, Feb. 24, 2022, Kyle Robert Drexler, 356/511000.

* cited by examiner

*Primary Examiner* — Luong T Nguyen
(74) *Attorney, Agent, or Firm* — Naval Information Warfare Center, Pacific; Kyle Eppele; James R. McGee

(57) ABSTRACT

A homodyne encoder encodes light sampled from an object with respective primary apertures for each spectral band. The multi-band homodyne encoder includes an optical spreader and a focusing optic. The optical spreader spreads apart the light from the respective primary apertures for each spectral band to respective secondary apertures for each spectral band. The optical spreader is arranged to spread, for each spectral band, the light from each one of the primary apertures for the spectral band to a respective one of the secondary apertures for the spectral band. The focusing optic focuses the light from the secondary apertures for all of the spectral bands into one or more composite images of the object. For each spectral band, every pairing of two of the primary apertures for the spectral band contributes distinct spatial frequencies to the composite image or images of the object.

20 Claims, 3 Drawing Sheets

MULTI-BAND HOMODYNE ENCODER

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 112882.

BACKGROUND OF THE INVENTION

Homodyne encoder devices have the limitations that a single narrow wavelength band is focused over a limited depth of field. There is a general need for imaging that is multispectral and diffraction limited despite atmospheric distortion over a wide depth of field.

SUMMARY

A multi-band homodyne encoder encodes light sampled from an object with respective primary apertures for each spectral band. The multi-band homodyne encoder includes an optical spreader and a focusing optic. The optical spreader spreads apart the light from the respective primary apertures for each spectral band to respective secondary apertures for each spectral band. The optical spreader is arranged to spread, for each spectral band, the light from each one of the primary apertures for the spectral band to a respective one of the secondary apertures for the spectral band. The focusing optic focuses the light from the secondary apertures for all of the spectral bands into at least one composite image of the object. For each spectral band, every pairing of two of the primary apertures for the spectral band contributes distinct spatial frequencies to the composite image of the object.

The focusing optic optionally includes an array of lenses for focusing the light from the secondary apertures into a respective composite image of the object for each lens in the array. For each spectral band, every pairing of two of the primary apertures for the spectral band contributes distinct spatial frequencies to each of the composite images.

A method encodes light sampled from an object with respective primary apertures for each spectral band. The light is received from the object at the primary apertures for all spectral bands. The light from the respective primary apertures for each spectral band is spread apart to respective secondary apertures for the spectral band. The light from the secondary apertures is focused into at least one composite image of the object. For each spectral band, every pairing of two of the primary apertures for the spectral band contributes distinct spatial frequencies to the composite image of the object. The distinct spatial frequencies for each aperture pairing are separated from the detected composite image. A wavefront shape of the light is determined that specifies a distortion. In response to the wavefront shape, the distortion is compensated to enhance the composite image of the object in each spectral band.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Embodiments of the invention provide homodyne encoder devices providing focused images that are diffraction limited despite atmospheric turbulence and also provide multispectral imaging and/or a wide depth of field of focusing.

Figure 1:
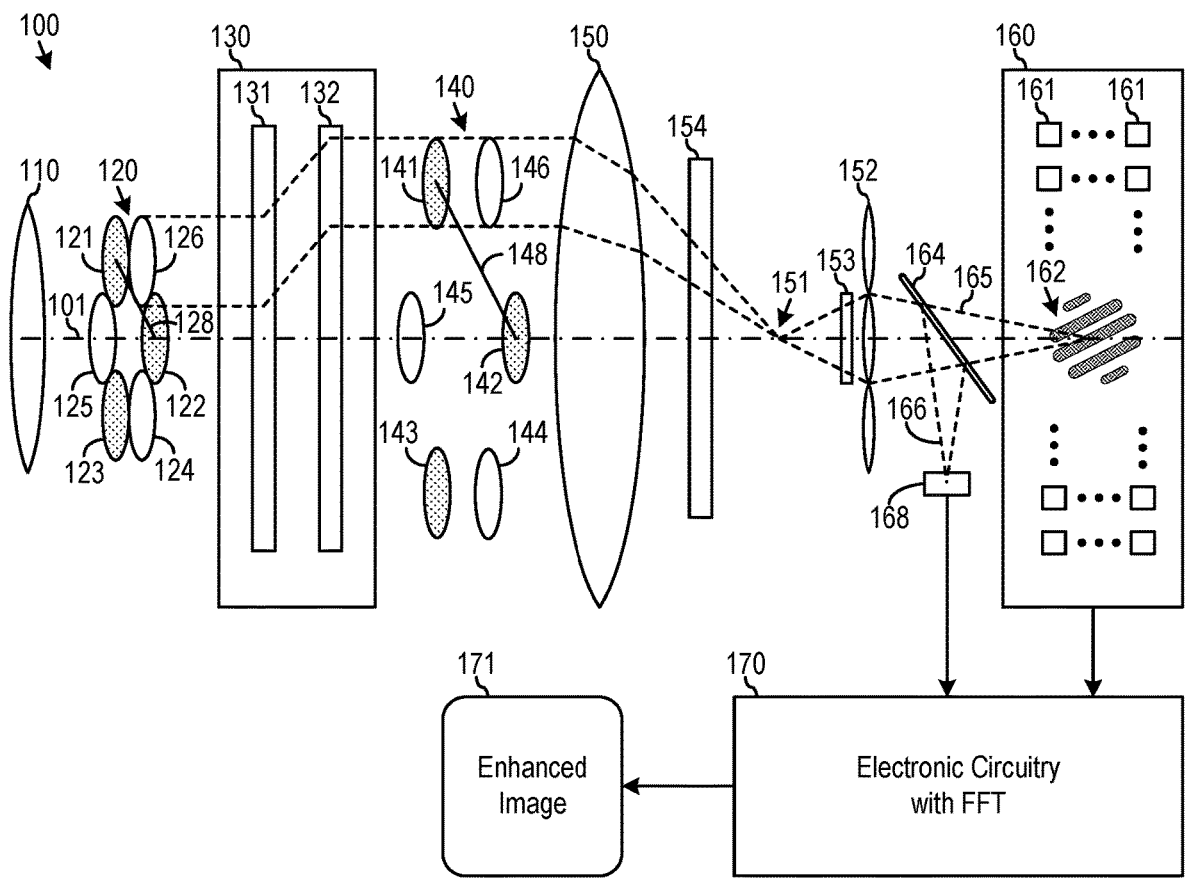
FIG. 1 is a schematic diagram of a multi-band homodyne encoder for encoding light sampled from an object with multiple primary apertures for each of multiple spectral bands in accordance with an embodiment of the invention.

FIG. 1 is a schematic diagram of a multi-band homodyne encoder 100 for encoding light sampled from an object with multiple primary apertures for each of multiple spectral bands in accordance with an embodiment of the invention.

The multi-band homodyne encoder 100 typically includes a collimating lens 110 that collimates the light passing through the primary apertures 120 for all of the spectral bands. The collimating lens 110 is optional when, for example, the object is sufficiently far away to fall within a depth of field extending to infinity of the multi-band homodyne encoder 100. This includes a depth of field enhanced with plenoptic sensing as discussed below.

The embodiment of the multi-band homodyne encoder 100 of FIG. 1 has six primary apertures 120 for encoding light from the object over two spectral bands. The six primary apertures 120 include three primary apertures 121, 122, and 123 for a first spectral band (shown shaded) and three primary apertures 124, 125, and 126 for a second spectral band. Similarly, six secondary apertures 140 include three secondary apertures 141, 142, and 143 for the first spectral band (shown shaded) and three secondary apertures 144, 145, and 146 for the second spectral band.

In general, the multi-band homodyne encoder 100 encodes light from the object over m spectral bands. The primary apertures 120 for all of the m spectral bands are n×m primary apertures, including n primary apertures for each of the m spectral bands. Similarly, the secondary apertures 140 for all of the m spectral bands are n×m secondary apertures, including n secondary apertures for each of the m spectral bands.

The multi-band homodyne encoder 100 includes an optical spreader 130 for spreading apart the light from the primary apertures 121, 122, and 123 for the first spectral band (shown shaded) to the secondary apertures 141, 142, and 143 for the first spectral band (shown shaded). This includes spreading the light from the primary aperture 121 to the respective secondary aperture 141, spreading the light from the primary aperture 122 to the respective secondary aperture 142, and spreading the light from the primary aperture 123 to the respective secondary aperture 143. Similarly, the optical spreader 130 respectively spreads apart the light from the three primary apertures 124, 125, and 126 for the second spectral band to the secondary apertures 144, 145, and 146 for the second spectral band. In general, the optical spreader 130 is arranged, for each spectral band, to spread apart the light from each of the primary apertures 120 for the spectral band to a respective one of the secondary apertures 140 for the spectral band.

The multi-band homodyne encoder 100 includes a focusing optic 150, such as a lens, for focusing the light from the secondary apertures 140 for all of the spectral bands into at least one composite image 151 of the object. Due to sufficient spreading in the optical spreader 130 from the primary apertures 120 to the secondary apertures 140, for each spectral band, every pairing of two of the primary apertures 120 for the spectral band contributes distinct spatial frequencies to the composite image 151 of the object. Thus, the spatial frequencies contributed by each pairing of the primary apertures 120 do not overlap in the composite image 151 due to the spreading of the optical spreader 130. For example, the pairing of the two primary apertures 121 and 122 for the first spectral band contributes distinct spatial frequencies to the composite image 151 because a baseline separation 148 between the corresponding two secondary apertures 141 and 142 is at least twice a baseline separation 128 between the two primary apertures 121 and 122.

In the embodiment of the multi-band homodyne encoder 100 of FIG. 1, the composite image 151 from the focusing optic 150 includes the distinct spatial frequencies for each of three different pairings of two of the three primary apertures 121, 122, and 123 for the first spectral band (shown shaded) and each of three different pairings of two of the three primary apertures 124, 125, and 126 for the second spectral band. For each of the first and second spectral bands, the distinct spatial frequencies for the three different pairings specify a piston, tip, and tilt distortion of the composite image 151 of the object.

The multi-band homodyne encoder 100 encodes light from more than two spectral bands in certain embodiments. To measure and compensate for piston, tip, and tilt distortion of the composite image 151 of the object, the multi-band homodyne encoder 100 typically includes three primary apertures 120 and three corresponding secondary apertures 140 for each of the spectral bands. For each spectral band, the distinct spatial frequencies of three different pairings of the two of the three primary apertures for the spectral band specify a piston, tip, and tilt distortion of the composite image 151, such as a piston, tip, and tilt distortion including an atmospheric distortion from an atmosphere between the object and the multi-band homodyne encoder 100.

The multi-band homodyne encoder 100 encodes light with more than three primary apertures 120 and correspondingly more than three secondary aperture 140 for each spectral band in certain embodiments. Additional apertures for each spectral band enable measurement and compensation of higher modes of distortion beyond the piston, tip, and tilt distortion in each spectral band. It will be appreciated that the multi-band homodyne encoder 100 encodes light for more than two spectral bands with more than three primary apertures 120 per spectral band in an embodiment.

In the embodiment of the multi-band homodyne encoder 100 of FIG. 1, the respective primary apertures 120 for each spectral band is three circular primary apertures 121, 122, and 123 for the first spectral band and three circular primary apertures 124, 125, and 126 for the second spectral band surrounding an axis 101 through the multi-band homodyne encoder 100. The three circular primary apertures 120 have a first baseline separation 128. Similarly, the respective secondary apertures 140 for each spectral band is three circular secondary apertures 141, 142, and 143 for the first spectral band and three circular secondary apertures 144, 145, and 146 for the second spectral band surrounding the axis 101. The three circular secondary apertures 140 have a second baseline separation 148.

The optical spreader 130 includes a first set 131 of diffractive optical elements and second set 132 of diffractive optical elements for transposing the light passing through the three circular primary apertures 120 for all of the spectral bands away from the axis 101 so that the second baseline separation 148 is at least twice the first baseline separation 128. For each spectral band, a respective diffractive optical element in the first set 131 for each of the three circular primary apertures for the spectral band diffracts the light away from the axis 101 and subsequently a respective diffractive optical element in the second set 132 equally diffracts the light back towards the axis 101 and into a respective one of the three circular secondary apertures 140 for the spectral band.

In a plenoptic embodiment, the multi-band homodyne encoder 100 includes an array of lenses 152 following the focusing optic 150. The focusing optic 150 and the array of lenses 152 together focus the light from the secondary apertures 140 for both of the spectral bands into multiple composite images, which include a respective composite image of the object for each of the lenses 152 in the array.

Sensors like sensor 160 detect the multiple composite images. The multi-band homodyne encoder 100 includes a respective sensor for each one of the lenses 152 in the array. The respective sensor includes a two-dimensional array of pixels 161 for detecting a respective composite image for each of the lenses 152 in the array.

The multi-band homodyne encoder 100 has a path length through the multi-band homodyne encoder 100 from the object to the respective composite image for each of the lenses 152. Because this path length through the multi-band homodyne encoder 100 increases for those of the lenses 152 farther from axis 101, a path length adjustment plate 153 accommodates these differing path lengths through the multi-band homodyne encoder 100. The central lens has a shorter path length than the two outer lenses shown in FIG. 1, so the central lens of lenses 152 has the path length adjustment plate 153 that increases the path length through the central lens to match the path length of each of the outer lenses. In general for more lenses 152, more than one of lenses 152 in the array has a path length adjustment plate 153 for focusing the light from the secondary apertures 140 for both of the spectral bands into the respective composite image for each the lenses 152 in the array.

In a preferred embodiment, the array of lenses 152 is instead located at position 154. This preferred embodiment shortens the overall length of the multi-band homodyne encoder 100 and requires less powerful and hence thinner lenses 152 in the array. In this preferred embodiment, the array of lenses 152 disposed at position 154 is considered to be part of the focusing optic 150. When the array of lenses 152 is instead disposed at position 154, the sensors, like sensor 160, are moved to detect the composite images near the composite image 151 shown in FIG. 1. For clarity of presentation, FIG. 1 shows the alternative embodiment with the array of lenses 152 disposed after the composite image 151.

The additional image sampling of the plenoptic embodiments with the array of lenses 152 collects more information than other embodiments of the invention. This extra collected information enables subsequent electronic processing that improves imaging, such as extending the depth of field where the object is in focus while still providing diffraction limited imaging despite atmospheric or other distortion.

The array of lenses 152 is optional. When array of lenses 152 is omitted, the sensor 160 or sensors are moved to detect at least one composite image 151. The following further discusses the multi-band homodyne encoder 100 with or without the array of lenses 152.

For illustrative purposes, FIG. 1 shows an example interference pattern 162 of light and dark bands at sensor 160. This example interference pattern 162 would occur when the object is an unresolved point source, when there is no atmospheric or other distortion, and when only the contribution of the pair of primary apertures 121 and 122 is considered. The overall diameter of the light and dark bands of the example interference pattern 162 for the point source is related to the resolving power and diameters of the primary apertures 121 and 122. The light passing the primary apertures 121 and 122 constructively and destructively interferes to produce the example interference pattern 162 with alternating light and dark bands perpendicular to the baselines 128 and 148.

When the contribution of the light passing through all of the primary apertures 120 is considered, the example interference pattern 162 becomes superimposed interference bands at various angles from every pairing of the apertures 120 in each spectral band. When distortion from an atmosphere or another heterogeneous medium is considered, the piston distortion defocuses and scales the example interference pattern 162, and the tip and tilt distortion displaces the example interference pattern 162 across the sensor 160. When the object is generalized beyond a point source, the example interference pattern 162 becomes the composite image 151 of the object with superimposed interference bands at various angles.

For the first spectral band of the primary apertures 121 and 122, the example interference pattern 162 has distinguishing spatial frequencies for the alternating light and dark bands due to the spreading from optical spreader 130. In general for the first spectral band, the distinct spatial frequencies for each of the three different pairings of two of the three primary apertures 121, 122, and 123 describe the interference pattern 162 between the light received from the object through these two of the three primary apertures 121, 122, and 123. Similarly for the second spectral band, every pairing of two of the three primary apertures 124, 125, and 126 contributes distinct spatial frequencies to the interference pattern 162. Thus, the interference pattern 162 from the three different pairings for each particular spectral band specify the piston, tip, and tilt distortion of the composite image 151 in the particular spectral band.

Sensor 160 includes a two-dimensional array of pixels 161 for detecting the interference pattern 162 of the composite image 151 of the object in one or more spectral bands. Because the interference pattern 162 includes distinct spatial frequencies for each pairing of the primary apertures 120 for each spectral band, these distinct spatial frequencies can be separated.

The multi-band homodyne encoder 100 includes electronic circuitry 170 for processing the interference pattern 162 the composite image 151 detected by sensor 160. The electronic circuitry 170 calculates a Fourier transform in two dimensions from the composite image 151 of the object. Typically, the Fourier transform is a fast Fourier transform calculated in software or in configurable hardware of a field-programmable gate array (FPGA). Because the optical spreader 130 spreads apart the light passing through the primary apertures 120 for all of the spectral bands, for every pairing of the two of the primary apertures 120 and for each spectral band, a respective interference pattern 162 between the light passing through the pairing of the primary apertures 120 for the spectral band has the distinct spatial frequencies across the two dimensions of the Fourier transform.

Next, the electronic circuitry 170 from the Fourier transform separates the distinct spatial frequencies of the respective interference pattern 162 for each pairing of the primary apertures 120 for each of the spectral bands. The electronic circuitry 170 calculates an inverse Fourier transform into the two dimensions from the distinct spatial frequencies separated for each pairing of the primary apertures 120 for each spectral band. The inverse Fourier transform specifies a projection of a wavefront shape of the light as received from the object, the projection along a baseline, such as baseline 128, through the pairing of the primary apertures for the spectral band. The electronic circuitry 170 determines the wavefront shape of the light as received from the object across the two dimensions collectively from the projection for each pairing of the primary apertures 120 for each of the spectral bands. The wavefront shape specifies a distortion from an atmosphere or another heterogeneous medium between the object and the multi-band homodyne encoder 100. Finally, the electronic circuitry 170 compensates for the distortion and enhances the composite image 151 of the object to produce enhanced image 171 in response to the wavefront shape of the light as received from the object.

In summary, for each spectral band, the electronic circuitry 170 separates the distinct spatial frequencies across the two-dimensional array of pixels 161 of the sensor 160, and compensates for the piston, tip, and tilt distortion of the composite image 151 in response to the distinct spatial frequencies separated across the two dimensional array of pixels 161 of the sensor 160.

FIG. 1 shows an optional spectral filter 164, such as a dichroic filter, following the focusing optic 150 for separating the light in the two spectral bands into a first light 165 in the first spectral band and a second light 166 in the second spectral band. A first sensor 160 with a two-dimensional array of pixels 161 detects the first spectral band in the first light 165 of a first composite image at interference pattern 162 for the composite image 151. A second sensor 168 with a two-dimensional array of pixels detects the second spectral band in the second light 166 of a second composite image for the composite image 151.

The electronic circuitry 170 separates the distinct spatial frequencies for the first spectral band from the two-dimensional array of pixels 161 of sensor 160 and separates the distinct spatial frequencies for the second spectral band from the second two-dimensional array of pixels of sensor 168. The electronic circuitry 170 compensates for the piston, tip, and tilt distortion of the first composite image at sensor 160 in response to the distinct spatial frequencies for the first spectral band and compensates for the piston, tip, and tilt distortion of the second composite image at sensor 168 in response to the distinct spatial frequencies for the second spectral band. This produces the enhanced image 171 including both spectral bands. For example, when the two spectral bands are red and green wavelengths, the enhanced image 171 is a color image, or when the two spectral bands are long and short infrared wavelengths, wavelengths, the enhanced image 171 is a false color image.

Alternatively, instead of spectral filter 164 and a second sensor 168 for detecting the second spectral band, the multi-band homodyne 100 includes a single sensor 160 with a two-dimensional array of pixels 161, and each of the pixels 161 includes a first and second filtered subpixel for respectively detecting the first and second spectral bands in the composite image 151. The electronic circuitry 170 separates the distinct spatial frequencies for the first spectral band from the first filtered subpixels across the two-dimensional array of pixels 161 and separates the distinct spatial frequencies for the second spectral band from the second filtered subpixels across the two-dimensional array of pixels 161. The electronic circuitry 170 compensates, for both the first and second spectral bands, the piston, tip, and tilt distortion of the composite image 151 in response to the distinct spatial frequencies for the first spectral band and the distinct spatial frequencies for the second spectral band.

One embodiment includes both spectral filter 164 and filtered subpixels of pixels 161 of sensors 160 and 168. For example, spectral filter 164 separates six spectral bands into three spectral bands within the first light 165 and three spectral bands within the second light 166. Sensor 160 has filtered subpixels of pixels 161 for detecting each of the three spectral bands within the first light 165, and sensor 168 has filtered subpixels for detecting each of the three spectral bands within the second light 166. In addition, when the array of lenses 152 is included, a sensor corresponding to each of sensors 160 and 168 is included for the respective composite image for each of the lenses 152. The electronic circuitry 170 separates the distinct spatial frequencies from the two-dimensional array of pixels of the respective sensor for each of the lenses 152 in each of the spectral bands, and compensates the piston, tip, and tilt distortion of the respective composite image for each of the lenses 152 in response to the distinct spatial frequencies for each of the spectral bands.

Figure 2:
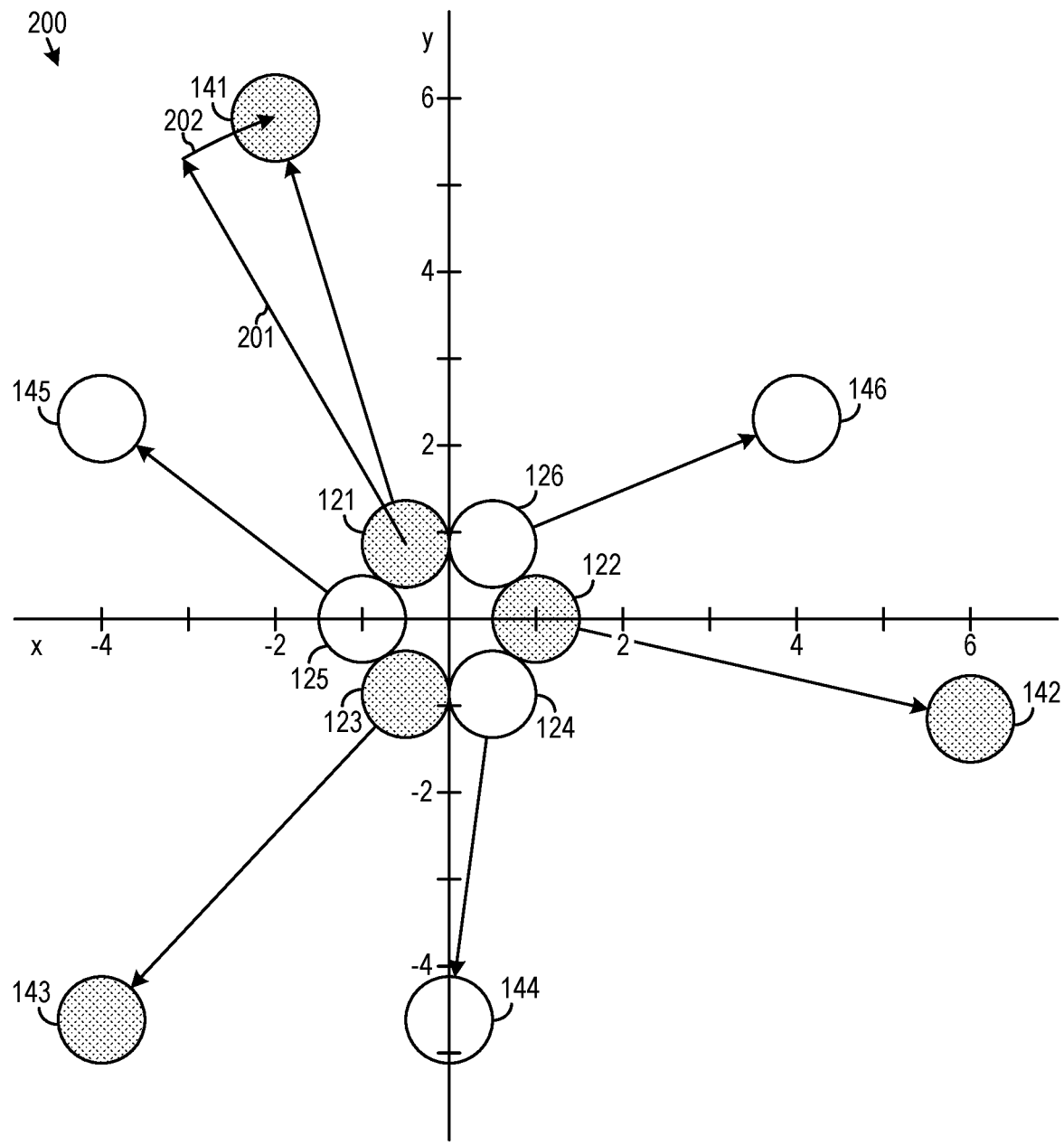
FIG. 2 is a plot illustrating spreading from multiple primary apertures to multiple secondary apertures for each of multiple spectral bands in a multi-band homodyne encoder for encoding light sampled from an object in accordance with an embodiment of the invention.

FIG. 2 is a plot 200 illustrating spreading from multiple primary apertures 121, 122, 123, 124, 125, and 126 to multiple secondary apertures 141, 142, 143, 144, 145, and 146 for each of multiple spectral bands in the multi-band homodyne encoder 100 of FIG. 1 for encoding light sampled from an object in accordance with an embodiment of the invention.

The primary apertures 121, 122, 123, 124, 125, and 126 sample light from an object. As shown with the arrows, the primary apertures 121, 122, 123, 124, 125, and 126 are spread to the secondary apertures 141, 142, 143, 144, 145, and 146, respectively. The scales of the axes are in units of the diameters of the primary and secondary apertures 121 through 126 and 141 through 146. The coordinates of the centers of the primary apertures 121, 122, 123, 124, 125, and 126 are (−0.5, 0.8660), (1, 0), (−0.5, −0.8660), (0.5, −0.8660), (−1, 0), and (0.5, 0.8660), respectively, and the coordinates the centers of the secondary apertures 141, 142, 143, 144, 145, and 146 are (−2, 5.7735), (6, −1.1547), (−4, −4.6188), (0, −4.6188), (−4, 2.3094), and (4, 2.3094), respectively.

FIG. 1 show a simplified optical spreader 130 that spreads only radially. FIG. 2 shows a preferred embodiment including both radial and circumferential spreading of the primary apertures 121 through 126 to the secondary apertures 141 through 146. For example, the spreading from primary aperture 121 to secondary aperture 141 includes radial component 201 and circumferential component 202. With this radial and circumferential spreading, the secondary apertures 141, 142, 143, 144, 145, and 146 form a non-redundant array for all of the spectral bands. Thus, with the spreading shown in FIG. 2 in the optical spreader 130 of FIG. 1, the focusing optic 150 focuses the light passing through the non-redundant array of the secondary apertures 141 through 146 from the optical spreader 130 into at least one composite image 151. Because the secondary apertures 141 through 146 form a non-redundant array, electronic circuitry 170 readily separates the distinct spatial frequencies for each pairing of the apertures 121 through 126 in each spectral band.

Figure 3:
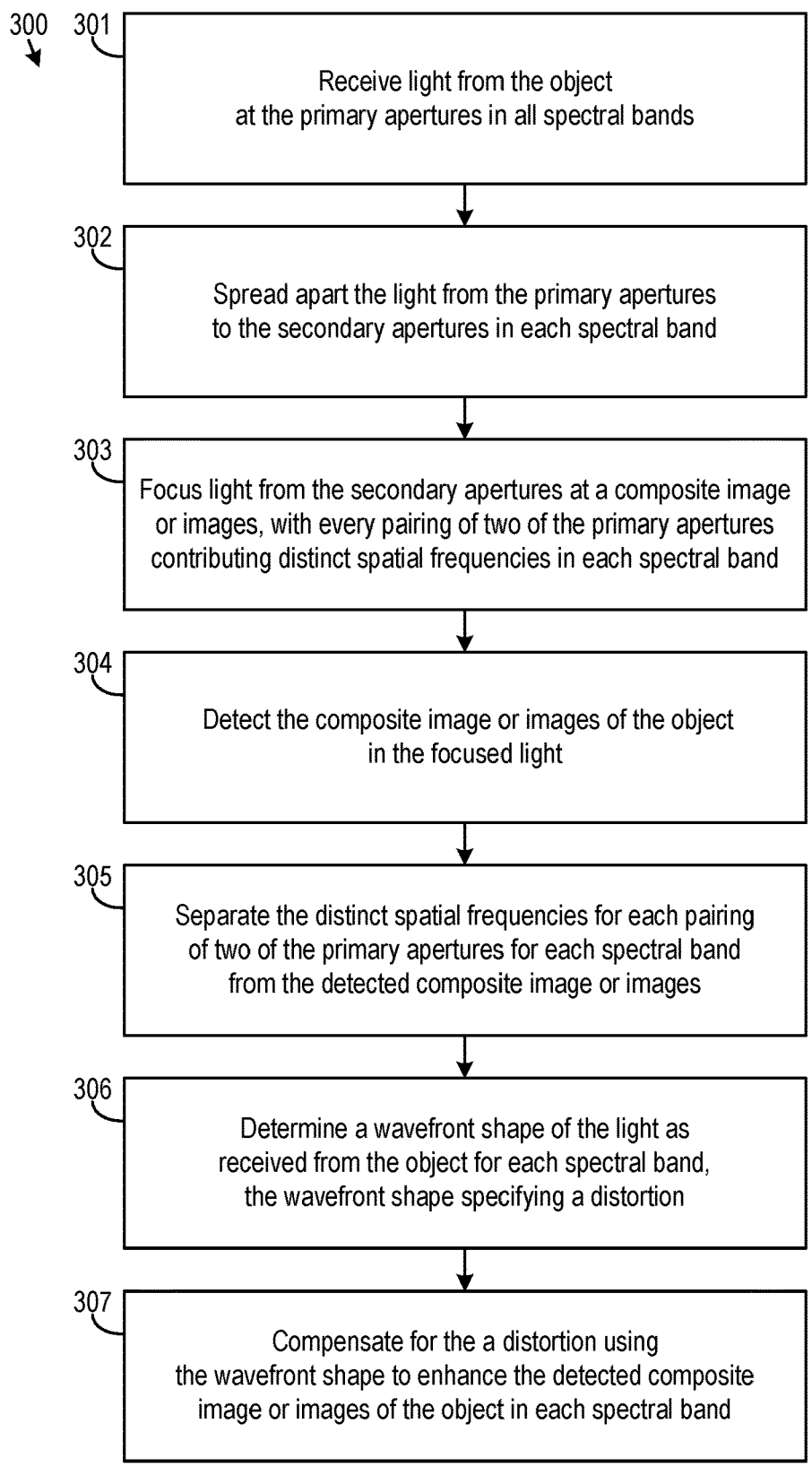
FIG. 3 is a flow diagram of a process for encoding light sampled from an object with multiple primary apertures for each of multiple spectral bands in accordance with an embodiment of the invention.

FIG. 3 is a flow diagram of a process 300 for encoding light sampled from an object with multiple primary apertures for each of multiple spectral bands in accordance with an embodiment of the invention.

At step 301, the light from the object is received at the primary apertures for all of the spectral bands. At step 302, the light is spread apart from the primary apertures for each spectral band to respective secondary apertures for the spectral band.

At step 303, the light from the secondary apertures for all of the spectral bands is focused into at least one composite image of the object. For each spectral band, every pairing of two of the primary apertures for the spectral band contributes distinct spatial frequencies to the composite image of the object. At step 304, the composite image of the object is detected with the focused light.

At step 305, the distinct spatial frequencies for each pairing of the two of the primary apertures for each spectral band are separated from the detected composite image. At step 306, a wavefront shape is determined for the light as received from the object for each spectral band. The wavefront shape for each spectral band specifies a distortion from a heterogeneous medium, such as an atmosphere, between the object and the multi-band homodyne encoder. At step 307, in response to the wavefront shape for each spectral band, the distortion is compensated to enhance the composite image of the object in each spectral band.

From the above description of a Multi-Band Homodyne Encoder, it is manifest that various techniques may be used for implementing the concepts of the multi-band homodyne encoder 100 and method 300 without departing from the scope of the claims. The described embodiments are to be considered in all respects as illustrative and not restrictive. The multi-band homodyne encoder 100 and the method 300 disclosed herein may be practiced in the absence of any element that is not specifically claimed and/or disclosed herein. It should also be understood that each of the multi-band homodyne encoder 100 or the method 300 is not limited to the particular embodiments described herein, but is capable of many embodiments without departing from the scope of the claims.

We claim:

1. A multi-band homodyne encoder for encoding light sampled from an object with a respective plurality of primary apertures for each of a plurality of spectral bands, the multi-band homodyne encoder comprising:

an optical spreader for spreading apart the light from the respective plurality of primary apertures for the each of the plurality of spectral bands to a respective plurality of secondary apertures for each of the plurality of spectral bands, the optical spreader arranged to spread, for each spectral band of the plurality of spectral bands, the light from each one of the respective plurality of primary apertures for the each spectral band to a respective one of the secondary apertures for the each spectral band; and a focusing optic for focusing the light from the plurality of secondary apertures for all of the plurality of spectral bands into at least one composite image of the object, wherein, for the each spectral band of the plurality of spectral bands, every pairing of two of the plurality of primary apertures for the each spectral band contributes distinct spatial frequencies to said at least one composite image of the object.

2. The multi-band homodyne encoder of claim 1, wherein the optical spreader is arranged to spread apart the light from the respective plurality of primary apertures for all of the plurality of spectral bands into the respective plurality of secondary apertures for all of the plurality of spectral bands by at least twice a baseline separation among the primary apertures for each of the plurality of spectral bands.

3. The multi-band homodyne encoder of claim 1, wherein:
the plurality of spectral bands is m spectral bands;
the primary apertures for all of the m spectral bands consists of n×m primary apertures including n primary apertures for each of the m spectral bands; and
the secondary apertures for all of the m spectral bands consists of n×m secondary apertures including n secondary apertures for each of the m spectral bands, wherein m and n are integers greater than or equal to 2.

4. The multi-band homodyne encoder of claim 1, wherein:
the respective plurality of primary apertures for each one of the plurality of spectral bands is three primary apertures for said one of the plurality of spectral bands;
the respective plurality of secondary apertures for each one of the plurality of spectral bands is three secondary apertures for said one of the plurality of spectral bands; and,
for the each spectral band of the plurality of spectral bands, the distinct spatial frequencies of three different pairings of the two of the three primary apertures for the spectral band specify a piston, tip, and tilt distortion of said at least one composite image, with the piston, tip, and tilt distortion including an atmospheric distortion from an atmosphere between the object and the multi-band homodyne encoder.

5. The multi-band homodyne encoder of claim 4, wherein, for each particular spectral band of the plurality of spectral bands:
the distinct spatial frequencies of each of the three different pairings of a first and second one of the two of the three primary apertures for the each particular spectral band describe an interference pattern between the light received from the object through the first and second one of the three primary apertures for the each particular spectral band; and
the interference pattern from the three different pairings for the each particular spectral band specify the piston, tip, and tilt distortion of said at least one composite image in the each particular spectral band.

6. The multi-band homodyne encoder of claim 4, further comprising:
a sensor with a two-dimensional array of pixels for detecting, for at least one of the plurality of spectral bands, said at least one composite image of the object; and
electronic circuitry for separating, for said at least one of the plurality of spectral bands, the distinct spatial frequencies across the two-dimensional array of pixels, and for compensating, for said at least one of the plurality of spectral bands, the piston, tip, and tilt distortion of said at least one composite image in response to the distinct spatial frequencies separated across the two dimensional array of pixels.

7. The multi-band homodyne encoder of claim 1, wherein:
the respective plurality of primary apertures for each of the plurality of spectral bands is three circular primary apertures surrounding an axis through the multi-band homodyne encoder, wherein the three circular primary apertures for each of the plurality of spectral bands have a first baseline separation;
the respective plurality of secondary apertures for each of the plurality of spectral bands is three circular secondary apertures surrounding the axis, wherein the three circular secondary apertures for each of the plurality of spectral bands have a second baseline separation, and the three circular secondary apertures for all of the plurality of spectral bands form a non-redundant array;
the optical spreader includes a first and second set of diffractive optical elements for transposing the light passing through the three circular primary apertures for all of the plurality of spectral bands radially and circumferentially away from the axis so that the second baseline separation is at least twice the first baseline separation, wherein, for each spectral band of the plurality of spectral bands, a respective diffractive optical element in the first set for each of the three circular primary apertures for the spectral band diffracts the light radially and circumferentially away from the axis and subsequently a respective diffractive optical element in the second set equally diffracts the light back towards the axis and into a respective one of the three circular secondary apertures for the spectral band; and
the focusing optic is a lens for focusing the light passing through the non-redundant array from the optical spreader into said at least one composite image.

8. The multi-band homodyne encoder of claim 1, wherein:
the plurality of spectral bands is two spectral bands including a first and second spectral band;
the primary apertures for both of the first and second spectral bands are six primary apertures, which include three primary apertures for each of the first and second spectral bands;
the secondary apertures for both of the first and second spectral bands are six secondary apertures, which include three secondary apertures for each of the first and second spectral bands; and
the optical spreader is arranged to spread apart the light sufficiently so said at least one composite image from the focusing optic includes the distinct spatial frequencies for each of three different pairings of the two of the three primary apertures for each of the first and second spectral bands, the distinct spatial frequencies for the three different pairings specifying a piston, tip, and tilt distortion of said at least one composite image.

9. The multi-band homodyne encoder of claim 8, further comprising:
a sensor with a two-dimensional array of pixels, which each include a first and second filtered subpixel for respectively detecting the first and second spectral bands in said at least one composite image; and
electronic circuitry for separating the distinct spatial frequencies for the first spectral band from the first filtered subpixel across the two-dimensional array of pixels and for separating the distinct spatial frequencies for the second spectral band from the second filtered subpixel across the two-dimensional array of pixels, and for compensating, for both the first and second spectral bands, the piston, tip, and tilt distortion of said at least one composite image in response to the distinct spatial frequencies for the first spectral band and the distinct spatial frequencies for the second spectral band.

10. The multi-band homodyne encoder of claim 8, further comprising:
a spectral filter following the focusing optic for separating the light in the two spectral bands into a first light in the first spectral band and a second light in the second spectral band;
a first sensor with a first two-dimensional array of pixels for detecting the first spectral band in the first light of a first composite image of said at least one composite image;
a second sensor with a second two-dimensional array of pixels for detecting the second spectral band in the second light of a second composite image of said at least one composite image; and
electronic circuitry for separating the distinct spatial frequencies for the first spectral band from the first two-dimensional array of pixels and for separating the distinct spatial frequencies for the second spectral band from the second two-dimensional array of pixels, and for compensating the piston, tip, and tilt distortion of the first composite image in response to the distinct spatial frequencies for the first spectral band and for compensating the piston, tip, and tilt distortion of the second composite image in response to the distinct spatial frequencies for the second spectral band.

11. The multi-band homodyne encoder of claim 8, further comprising:
an array of lenses following the focusing optic, the focusing optic and the array of lenses for focusing the light from the secondary apertures for both of the first and second spectral bands into said at least one composite image, which is a plurality of composite images including a respective composite image of the object for each of the lenses in the array; and
a plurality of sensors, which include a respective sensor for each one of the lenses in the array, the respective sensor including a two-dimensional array of pixels for detecting the respective composite image for said one of the lenses in the array.

12. The multi-band homodyne encoder of claim 11, wherein at least one of the lenses in the array has a path length adjustment plate for focusing the light from the secondary apertures for both of the first and second spectral bands into the respective composite image for said one of the lenses in the array to accommodate differing path lengths through the multi-band homodyne encoder.

13. The multi-band homodyne encoder of claim 11, further comprising:
electronic circuitry for separating the distinct spatial frequencies from the two-dimensional array of pixels of the respective sensor for each of the lenses in both of the first and second spectral bands, and for compensating the piston, tip, and tilt distortion of the respective composite image for each of the lenses in response to the distinct spatial frequencies for both of the first and second spectral bands.

14. The multi-band homodyne encoder of claim 1, further comprising:
an array of lenses following the focusing optic, the focusing optic and the array of lenses for focusing the light from the secondary apertures for all of the plurality of spectral bands into said at least one composite image, which is a plurality of composite images including a respective composite image of the object for each of the lenses in the array, wherein at least one of the lenses in the array has a path length adjustment plate to accommodate differing path lengths through the multi-band homodyne encoder; and
a plurality of sensors, which include a respective sensor for each one of the lenses in the array, the respective sensor including a two-dimensional array of pixels for detecting the respective composite image for said one of the lenses in the array.

15. The multi-band homodyne encoder of claim 1, further comprising electronic circuitry configured to:
calculate a Fourier transform in two dimensions from said at least one composite image of the object, wherein because the optical spreader spreads apart the light passing through the primary apertures for all of the spectral bands into a non-redundant array of the secondary apertures for all of the plurality of spectral bands, for every pairing of the two of the primary apertures for each spectral band of the plurality of spectral bands, a respective interference pattern between the light passing through the pairing of the primary apertures for the spectral band has the distinct spatial frequencies across the two dimensions of the Fourier transform.

16. The multi-band homodyne encoder of claim 15, wherein the electronic circuitry is further configured to:
separate, from the Fourier transform, the distinct spatial frequencies of the respective interference pattern for each pairing of the primary apertures for each of the plurality of spectral bands;
calculate an inverse Fourier transform into the two dimensions from the distinct spatial frequencies separated for each pairing of the primary apertures for each spectral band of the plurality of spectral bands, the inverse Fourier transform specifying a projection of a wavefront shape of the light as received from the object, the projection along a baseline through the pairing of the primary apertures for the spectral band; and
determine the wavefront shape of the light as received from the object across the two dimensions collectively from the projection for each pairing of the primary apertures for each of the plurality of spectral bands, the wavefront shape specifying an atmospheric distortion from an atmosphere between the object and the multi-band homodyne encoder.

17. The multi-band homodyne encoder of claim 16, wherein the electronic circuitry is further configured to:
compensate for the atmospheric distortion and enhance the composite image of the object in response to the wavefront shape of the light as received from the object.

18. A homodyne encoder for encoding light sampled from an object with a respective plurality of primary apertures for each of at least one spectral band, the homodyne encoder comprising:
an optical spreader for spreading apart the light from the respective plurality of primary apertures for each of said at least one spectral band to a respective plurality of secondary apertures for each of said at least one spectral band, the optical spreader arranged to spread, for each particular spectral band of said at least one spectral band, the light from each one of the primary apertures for the each particular spectral band to a respective one of the secondary apertures for the each particular spectral band;
a focusing optic including an array of lenses for focusing the light from the secondary apertures for all of said at least one spectral band into a plurality of composite images including a respective composite image of the object for each of the lenses in the array, wherein, for the each particular spectral band of said at least one spectral band, every pairing of two of the primary apertures for the each particular spectral band contributes distinct spatial frequencies to each of the plurality of composite images of the object; and a plurality of sensors, which include a respective sensor for each one of the lenses in the array, the respective sensor including a two-dimensional array of pixels for detecting the respective composite image for said one of the lenses in the array.

19. A method for encoding the light sampled from the object with the respective plurality of primary apertures for each of the plurality of spectral bands in the multi-band homodyne encoder of claim 1, comprising:

receiving the light from the object at the respective plurality of primary apertures for all of the plurality of spectral bands;

spreading apart the light from the respective plurality of primary apertures for each of the spectral bands to the respective plurality of secondary apertures for each of the plurality of spectral bands;

focusing the light from the secondary apertures for all of the plurality of spectral bands into said at least one composite image of the object, wherein, for each spectral band of the plurality of spectral bands, every pairing of the two of the primary apertures for the spectral band contributes the distinct spatial frequencies to said at least one composite image of the object;

detecting said at least one composite image of the object with the light from the focusing;

separating the distinct spatial frequencies for each pairing of the two of the primary apertures for each of the plurality of spectral bands from said at least one composite image of the detecting;

determining a wavefront shape of the light as received from the object for each of the plurality of spectral bands, the wavefront shape for each of the plurality of spectral bands specifying a distortion from a heterogeneous medium between the object and the multi-band homodyne encoder; and in response to the wavefront shape for each of the plurality of spectral bands, compensating for the distortion to enhance said at least one composite image of the object for each of the plurality of spectral bands.

20. A method for encoding light sampled from an object with a respective plurality of primary apertures for each of a plurality of spectral bands in a multi-band homodyne encoder, comprising:

receiving the light from the object at the primary apertures for all of the plurality of spectral bands;

spreading apart the light from the respective plurality of primary apertures for each of the plurality of spectral bands to a respective plurality of secondary apertures for each of the plurality of spectral bands;

focusing the light from the plurality of secondary apertures for all of the plurality of spectral bands into at least one composite image of the object, wherein, for each spectral band of the plurality of spectral bands, every pairing of two of the primary apertures for the each spectral band contributes distinct spatial frequencies to said at least one composite image of the object;

detecting said at least one composite image of the object with the light from the focusing;

separating the distinct spatial frequencies for each pairing of the two of the primary apertures for each of the plurality of spectral bands from said at least one composite image of the detecting;

determining a wavefront shape of the light as received from the object for each of the plurality of spectral bands, the wavefront shape for each of the plurality of spectral bands specifying a distortion from a heterogeneous medium between the object and the multi-band homodyne encoder; and in response to the wavefront shape for each of the plurality of spectral bands, compensating for the distortion to enhance said at least one composite image of the object for each of the plurality of spectral bands.

* * * * *